M. W. ASKIN.
DRINKING FOUNTAIN AND WATER MIXING ATTACHMENT FOR FAUCETS.
APPLICATION FILED DEC. 20, 1917.
1,366,150.
Patented Jan. 18, 1921.
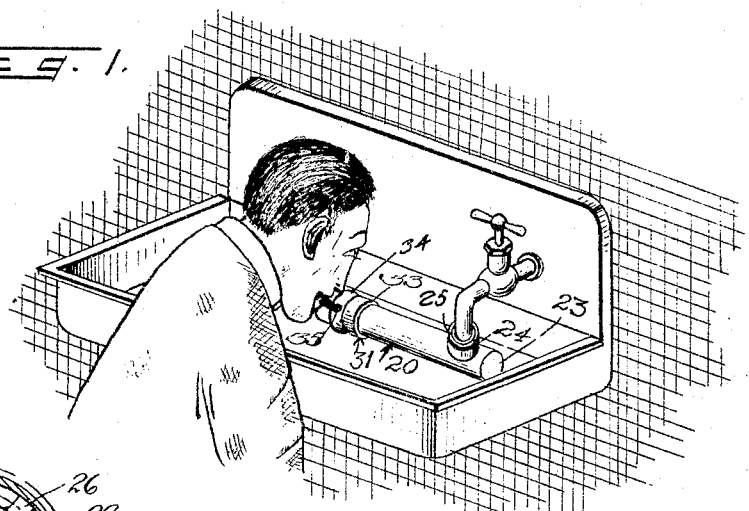
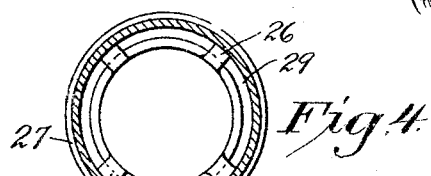
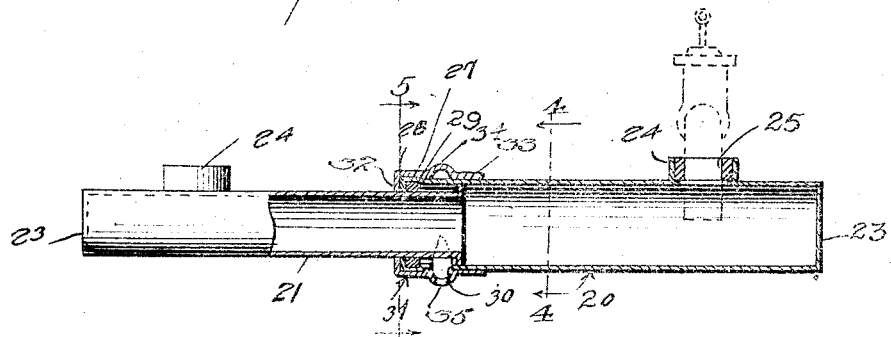
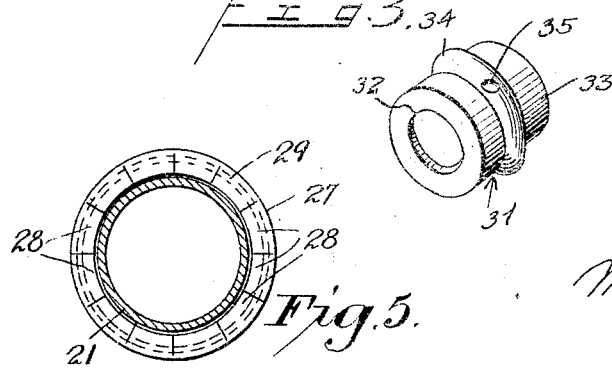
Inventor
Morris W. Askin

UNITED STATES PATENT OFFICE.

MORRIS WASSER ASKIN, OF WASHINGTON, DISTRICT OF COLUMBIA.

DRINKING-FOUNTAIN AND WATER-MIXING ATTACHMENT FOR FAUCETS.

1,366,150. Specification of Letters Patent. Patented Jan. 18, 1921.

Application filed December 20, 1917. Serial No. 208,142.

*To all whom it may concern:*

Be it known that I, MORRIS WASSER ASKIN, a citizen of the United States, residing at Washington, D. C., have invented certain new and useful Improvements in Drinking-Fountain and Water-Mixing Attachments for Faucets, of which the following is a specification.

My invention relates to faucet attachments, and its object is to provide an attachment which will serve both as a drinking-fountain and as a ready means for mixing hot and cold water supplied by the faucets to which the device may be attached.

Figure 1 is a perspective view of the device in operation as a drinking fountain.

Fig. 2 is a central section partly in elevation of the device in position for attachment to a pair of faucets.

Fig. 3 is a perspective detail of a rotary thimble which overlies the joint connecting the members forming the device.

Fig. 4 is a sectional view on the line 4—4 of Fig. 2.

Fig. 5 is a sectional view on the line 5—5, the thimble being removed.

The attachment comprises the tubular member 20 and the tubular member 21 telescoping in the member 20 and guided therein by the fingers 26 whereby the length of the attachment may be varied to adapt it to faucets spaced apart different distances.

A water-tight joint between the tubular members is produced by an enlargement 27 formed on one end of the member 20, said enlargement having its end wall slitted to form an annular series of tongues 28 and turned in as shown in Figs. 2 and 5, the enlargement retaining an elastic ring or gasket 29 in water-tight engagement with the member 21.

Near said enlargement the member 20 has a perforation 30.

Rotatably mounted on the joint end of the member 20 is the sleeve 31. This sleeve has an inturned end 32 overlying the inturned wall formed by the slitted portions 28, a cylindrical portion 33 surrounding the member 20, and an intermediate enlarged portion or bead 34 forming an annular channel. Said bead has in its wall a discharge perforation 35. When this perforation is directed downward by suitable rotation of the sleeve 31, the perforation registers with the perforation 30, and water from either or both of the faucets will be directed downward as in ordinary faucet operation. When the sleeve is so positioned that the discharge perforation is directed upward at any desired angle, water from either or both of the faucets will issue from the discharge perforation in such a direction that it may be used as a drinking jet or in any other suitable way.

Near the remote ends of the members 20 and 21 are extensions 24 lined with elastic or other suitable rings 25 to facilitate the attachment of the whole device to a pair of faucets or similar discharge means the two members being telescopingly adjusted to register the extensions 24 with the discharge means.

What I claim as my invention is:

1. A telescopic drinking-fountain and water-mixer comprising an outer and an inner tubular member telescopically united, the outer member having a discharge port, the inner member carrying with it spacing means to slidably engage the inner surface of the outer member and provide an annular water passage to the discharge port.

2. A telescopic water-mixer to mix hot and cold water, comprising two members telescopically united, the outer member provided with an annular series of inturned tongues firmly clasping a yielding gasket against the internal shoulder of a channel provided for the gasket in the outer member, thus providing a leak proof joint between the members.

3. A telescopic drinking-fountain and water-mixer comprising two members telescopically united, one member having a discharge port, a rotatable sleeve on one of the members, said sleeve having a discharge port adapted to be brought into register with the first-named discharge port, or to be placed at any desired angle for use as a drinking-fountain or other suitable instrument.

MORRIS WASSER ASKIN.